United States Patent [19]
Mickael

[11] Patent Number: 6,124,590
[45] Date of Patent: Sep. 26, 2000

[54] METHOD FOR DETERMINING THERMAL NEUTRON CAPTURE CROSS-SECTION OF EARTH FORMATIONS USING MEASUREMENTS FROM MULTIPLE CAPTURE GAMMA RAY DETECTORS

[75] Inventor: Medhat W. Mickael, Sugar Land, Tex.

[73] Assignee: Western Atlas International, Inc., Houston, Tex.

[21] Appl. No.: 09/120,442

[22] Filed: Jul. 22, 1998

Related U.S. Application Data

[63] Continuation-in-part of application No. 08/965,242, Nov. 6, 1997.

[51] Int. Cl.$^7$ ........................................ G01V 5/00
[52] U.S. Cl. ........................... 250/264; 250/269.6
[58] Field of Search .................... 367/25; 250/269.6, 250/266, 262, 264, 270, 269.7

[56] References Cited

U.S. PATENT DOCUMENTS

| | | | |
|---|---|---|---|
| 4,170,732 | 10/1979 | Randall | 250/264 |
| 5,808,298 | 9/1998 | Mickael | 250/269.6 |

*Primary Examiner*—Christine K. Oda
*Assistant Examiner*—Anthony Jolly
*Attorney, Agent, or Firm*—Richard A. Fagan; Madan, Mossman & Sriram

[57] ABSTRACT

A method for determining thermal neutron capture cross-section of an earth formation penetrated by a wellbore from counts of capture gamma rays detected at spaced apart locations from a source irradiating the formations with bursts of high energy neutrons. An apparent capture cross-section is determined from counts detected at one of the spaced apart locations. The apparent capture cross-section is adjusted by a correction factor calculated from counts detected at each of the spaced apart locations. The correction factor is calculated from an empirical relationship of known values of formation capture cross-section, wellbore diameter and wellbore capture cross section, with respect to counts detected at each of the spaced apart locations. Coefficients of the empirical relationship are determined by simulating counts which would be detected in response to the known values of formation capture cross-section, wellbore diameter and capture cross section. The coefficients are adjusted until differences between capture cross-section calculated by the relationship from the simulated counts and the known values of formation capture cross-section are minimized. In the preferred embodiment, coefficients are calculated for each one of at least two time regions into which the counts between successive bursts are segregated.

20 Claims, 8 Drawing Sheets

METHOD FOR DETERMINING THERMAL NEUTRON CAPTURE CROSS-SECTION OF EARTH FORMATIONS USING MEASUREMENTS FROM MULTIPLE CAPTURE GAMMA RAY DETECTORS

CROSS-REFERENCE TO RELATED APPLICATIONS

This is a continuation in part of application serial no. 08/965,242 filed on Nov. 6, 1997, entitled, "Method for Determining Thermal Neutron Capture Cross-Section of Earth Formations Using Measurements from Multiple Capture Gamma Ray Detectors", and assigned to the assignee of this invention.

BACKGROUND OF THE INVENTION

1. Field of the Invention

The invention is related to the field of measurement of thermal neutron capture cross-section of earth formations penetrated by a wellbore. More specifically, the invention is related to methods for determining the thermal neutron capture cross-section of the earth formations where the measurements are corrected for neutron diffusion and the effects of salinity of fluid in the wellbore.

2. Description of the Related Art

A number of well logging instruments are known in the art for measuring the thermal neutron capture cross-section (or its inverse, the thermal neutron "die-away" or "decay" time) of earth formations. See U.S. Pat. No. 4,041,309 issued to Hopkinson, for example. These well logging instruments typically include a controllable source of high energy neutrons. Some types of thermal neutron capture cross-section instruments include a single gamma ray photon detector spaced apart from the source along the instrument. The neutron source emits controlled-duration "bursts" of high energy neutrons into the earth formations surrounding the instrument. The high energy neutrons interact with atomic nuclei in the formations, decreasing in energy with such interactions until they reach the "thermal" energy level (generally defined as an average energy of about 0.025 electron volts), whereupon they may be absorbed, or "captured", by certain atomic nuclei in the earth formations which have a relatively high tendency to capture thermal neutrons. When such a nucleus captures a thermal neutron, it emits a gamma ray (called a "capture gamma ray") in response. The capture gamma rays are detected by the gamma ray photon detector. The rate at which the numbers of detected capture gamma rays decreases with respect to the elapsed time after the end of the neutron burst is related to the capture cross-section of the particular earth formation, among other things.

The thermal neutron capture cross-section as determined from the counts of gamma rays made by a single detector generally has to be corrected for the effect of the salinity of the fluid in the wellbore and for the effect of neutron diffusion. Various corrections have been devised for the single-detector type instrument based on laboratory measurements of the response of such instruments to various known salinity fluids in a simulated wellbore. Using the laboratory-derived correction methods on measurements made in an actual wellbore requires knowledge of the salinity of the wellbore fluid, which can be difficult and expensive to determine. It should be noted that it is common practice to measure the electrical resistivity of the fluid in the wellbore, but as is well known in the art, the electrical resistivity is only partially related to the concentration of sodium chloride (the salinity) in the wellbore fluid, since other chemical components may be present in the fluid which affect the overall electrical conductivity of the fluid but not its capture cross-section. The salinity of the wellbore fluid can have a pronounced effect on the measurements of capture cross-section of the earth formation because chlorine nuclei have a very high capture cross-section.

Improvements to the measurements obtained using a single-detector instrument include providing a second gamma ray detector on the instrument spaced further away from the source than is the first detector. Measurements of capture gamma rays from the second detector can be used to provide some correction to the measurements made by the first detector in determining the thermal neutron capture cross-section of the earth formations. U.S. Pat. No. 4,445,033 issued to Preeg et al describes such an instrument and a method for processing the measurements from both detectors to obtain "corrected" capture cross-section measurements. The method and apparatus described in the Preeg et al '033 patent, however, still requires knowledge of the salinity of the fluid in the wellbore.

Another two-detector technique for determining neutron capture cross-section is described in U.S. Pat. No. 3,509,342 issued to Dewan. The method described in this patent is intended to correct the capture cross-section measurements for the fractional volume of pore space ("porosity") in the earth formations. The method in the Dewan '342 patent, however, does not account for the effects of the fluid in the wellbore, which effect is strongly related the salinity of the fluid in the wellbore.

Still another method for determining neutron capture cross-section is described in U.S. Pat. No. 5,235,185 issued to Albats et al. The method described in the Albats et al '185 patent uses measurements from a gamma ray detector and a detector sensitive primarily to thermal neutrons in order to provide diffusion correction to the capture cross-section measurements. The correction method described in the Albats et al '185 patent, however, requires knowledge of the salinity of the fluid in the wellbore, the size (local diameter) of the wellbore in the vicinity of the logging instrument and the porosity of the earth formation.

The prior art does not disclose a method for determining the thermal neutron capture cross-section of earth formations which accounts for neutron diffusion and does not require explicit knowledge of the salinity of the fluid in the wellbore or the porosity of the earth formations.

SUMMARY OF THE INVENTION

The invention is a method for determining the thermal neutron capture cross-section of an earth formation penetrated by a wellbore, from counts of capture gamma rays detected at spaced apart locations from a pulsed neutron source irradiating the earth formations with repetitive bursts of high energy neutrons. An apparent capture cross-section is determined from the counts detected at one of the spaced apart locations. The thermal neutron capture cross-section of the earth formation is calculated by adjusting the apparent capture cross-section by a correction factor, which is calculated from counts detected at each of the spaced apart locations. The correction factor is calculated from an empirical relationship of known values of capture cross-section, known values of wellbore diameter and wellbore capture cross-section, with respect to counts at each of the spaced apart locations.

In the preferred embodiment of the invention, the empirical relationship is determined by segregating the counts from each spaced apart location simulated in response to the known values into at least two time regions between successive neutron bursts. The empirical relationship is determined when an error function consisting of differences between the known value of formation capture cross section and the value of formation capture cross section calculated according to the empirical relationship is minimized. In one embodiment of the invention, there are three time regions and two spaced apart locations.

DESCRIPTION OF THE PREFERRED EMBODIMENT

1. Well Logging Apparatus According to the Invention

Figure 1:
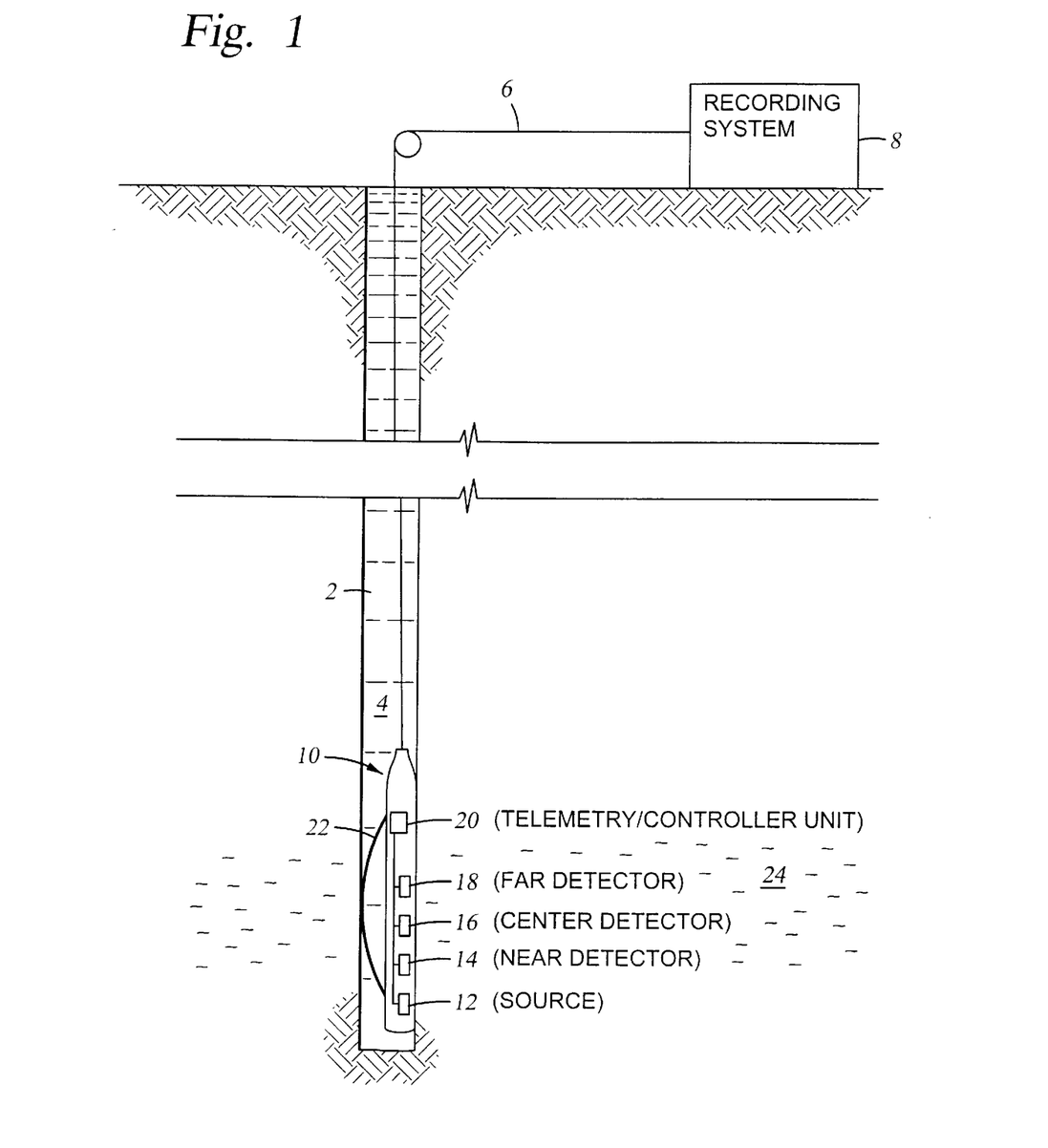
FIG. 1 shows in general form a thermal neutron capture cross-section measuring instrument according to the invention having three spaced apart gamma ray detectors.

A well logging instrument for measuring thermal neutron capture cross-section is shown generally at 10 in FIG. 1. The logging instrument 10 can be extended into a wellbore 2 attached to one end of an armored electrical cable 6. The wellbore 2 is drilled through various earth formations, shown generally at 24. The cable 6 can be extended into and withdrawn from the wellbore 2 to move the instrument 10 therethrough, by means of a spool or winch (not shown separately) forming part of a recording system 8 located at the earth's surface. The wellbore 2 is typically filled with a fluid, shown at 4, which can have varying concentrations of sodium chloride ("salinity") and other neutron absorbing substances in solution and/or suspension. The measurements made by the instrument 10 are intended to determine, among other parameters, the thermal neutron capture cross-section of the earth formations 24.

Typically the recording system 8 supplies electrical power to the logging instrument 10 over the cable 6, and signals generated by the instrument 10 are returned to the recording system 8 over the cable 6 for decoding and interpretation. The signals can be imparted to the cable 6 by a telemetry/controller unit, shown generally at 20. The telemetry/controller unit 20 stores, for communication to the cable 6, voltage pulses generated by each one of three detectors 14, 16 and 18 in response to detection of gamma rays by each detector 14, 16, 18. The telemetry/controller unit 20 can also include devices for recording the number of pulses detected by each detector for later processing at the earth's surface according to the method of this invention.

The telemetry/controller unit 20 can also provide control signals to selectively operate a "pulsed" source 12 of high energy neutrons. One such source suitable for use in the instrument 10 is described for example, in U.S. Pat. No. 4,996,017 issued to Ethridge. The source 12 in this embodiment generates controlled duration "bursts" of neutrons having an average energy of about 14 million electron volts.

The detectors can include a near detector 14, which can be a scintillation counter gamma ray photon detector having a thallium-doped sodium iodide crystal 1 inch in diameter and four inches in length, located about 13 inches from the "target" in the source 12. A center detector 16 can be a similar type scintillation counter gamma ray photon detector having its crystal located about 20 inches from the source 12 target. A far detector can be a 1 inch diameter, 6 inch long scintillation gamma detector having its crystal located about 28 inches from the source 12. The detector types, sizes and spacing described herein are only examples of combinations of detectors and their spacings from the source 12 and are not meant to limit the invention. Any other suitable gamma ray photon detector, such as a Geiger-Mueller counter, can be used for any one, or for all of the detectors 14, 16, 18. Further, it is to be clearly understood that the invention is not limited to using three gamma ray photon detectors. Three detectors 14, 16, 18 are shown in this example only to explain the method of the invention. The method of processing detector counts, which will be explained further herein, contemplates using the counts from any number of detectors, such as four, five or more, as long as there is more than one gamma ray photon detector in the instrument 10.

It should be noted that the accuracy of the results obtained using the method of this invention will be improved if a larger number of detectors is used. However, the number of detectors would be limited as a practical matter by the statistical precision of the measurements made by the detectors which are farthest away from the source 12. As is well known in the art, the statistical precision of the measurements made by a nuclear detector is generally inversely related to its distance from the source 12. As more detectors are added to the instrument, the measurements made by farther spaced detectors necessarily would have progressively lower statistical precision.

The instrument 10 is preferably urged into contact with the wall of the wellbore 2 by means of a bowspring 22 or any other eccentralizing device known in the art.

In operating the instrument 10, the telemetry/controller 20 periodically causes the source 12 to emit bursts of high energy neutrons, as previously explained. Generally after the end of each neutron burst, the detectors 14, 16, 18 detect gamma rays which enter the crystals of each detector 14, 16, 18. Each detector in turn emits a voltage pulse corresponding to each detected gamma ray. The voltage pulses can in turn be "tagged" with the time of detection with respect to the time of the neutron burst. For each detector 14, 16, 18 the numbers of detections ("counts") between each neutron burst, and the times of detection, can be stored in the telemetry/controller unit 20 or transmitted to the recording unit 8 for further processing according to the invention.

2. Detector Count Processing According to the Invention

As is well known in the art, the numbers of gamma rays counted by each detector 14, 16, 18 with respect to the amount of time after the end of each neutron burst is related to a number of properties of the wellbore 2 and the earth formations 24, including the thermal neutron capture cross-section ($\Sigma$) of the earth formations 24 adjacent to the instrument 10, the diameter of the wellbore 2 in which the instrument is disposed, and the thermal neutron capture cross-section of the fluid 4 in the wellbore 2 (which is substantially, but not solely related to the salinity of the fluid 4). For convenience, the capture cross-section of the fluid in the wellbore will be referred to as the wellbore capture cross-section.

Figure 2:
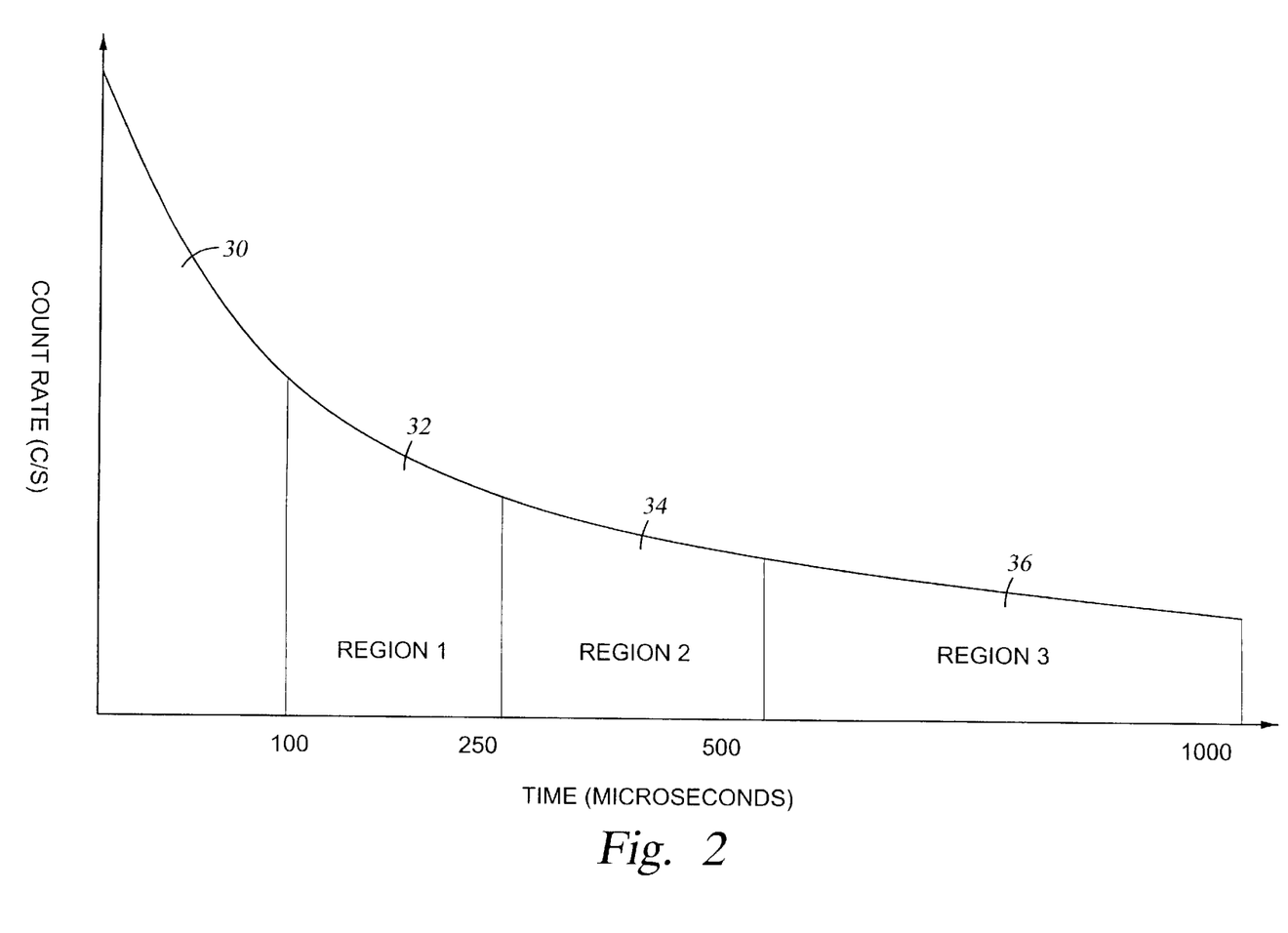
FIG. 2 shows a graph of the rate at which capture gamma rays are detected at one of the detectors of the instrument in FIG. 1, with respect to time.
Figure 3:
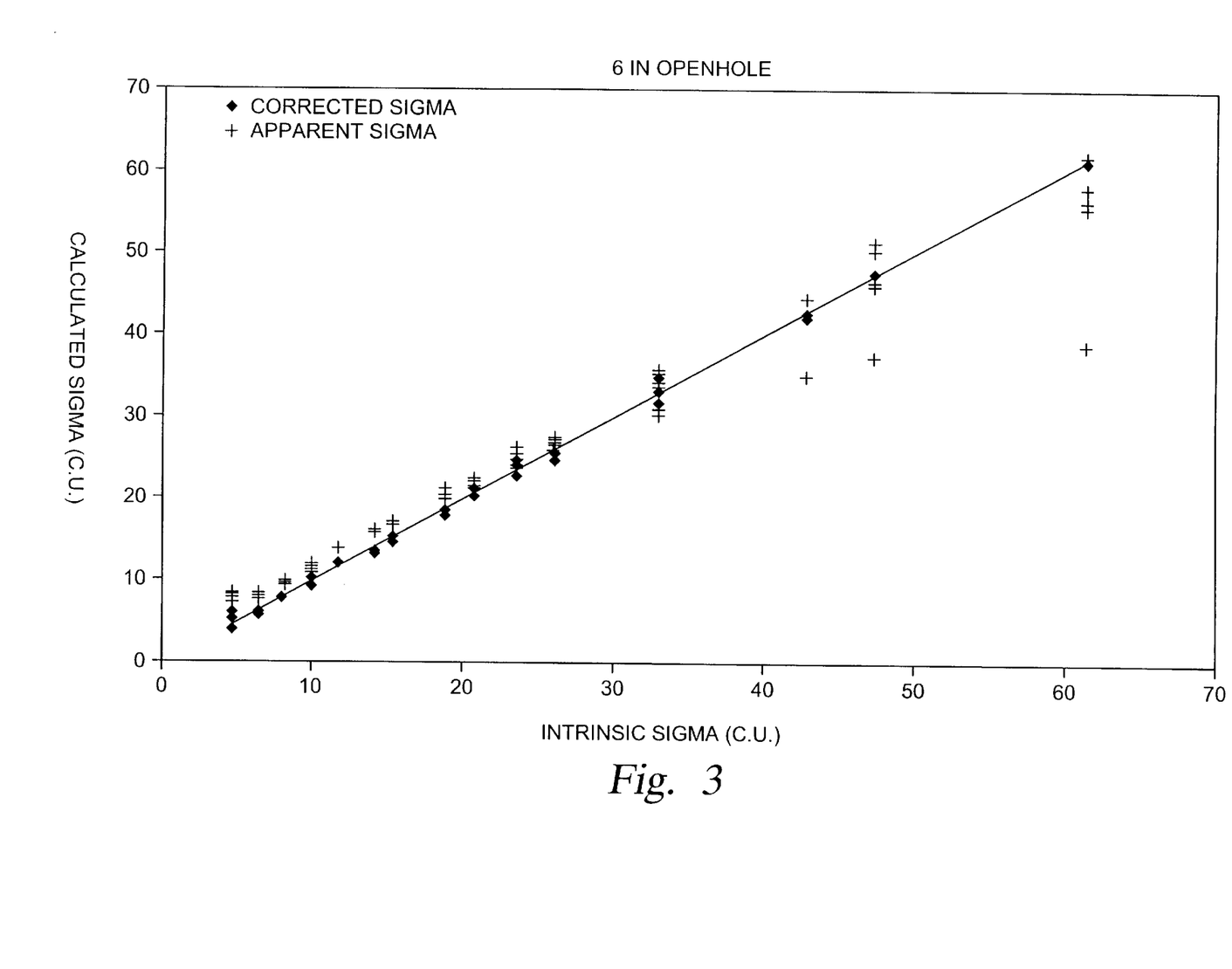
FIGS. 3–8 show graphs of the response of the method of the invention to various simulated formation and wellbore conditions.
Figure 4:
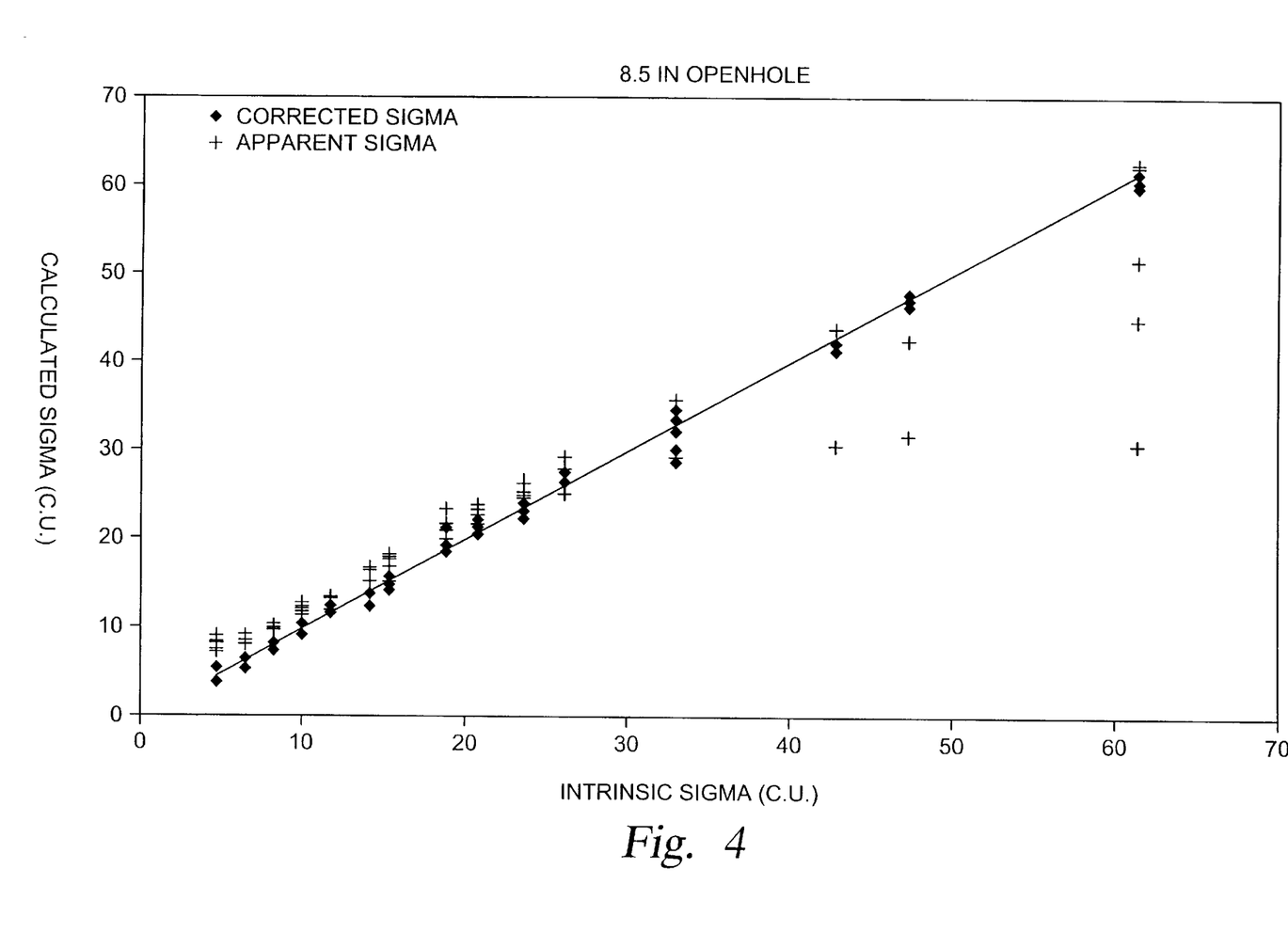
Figure 5:
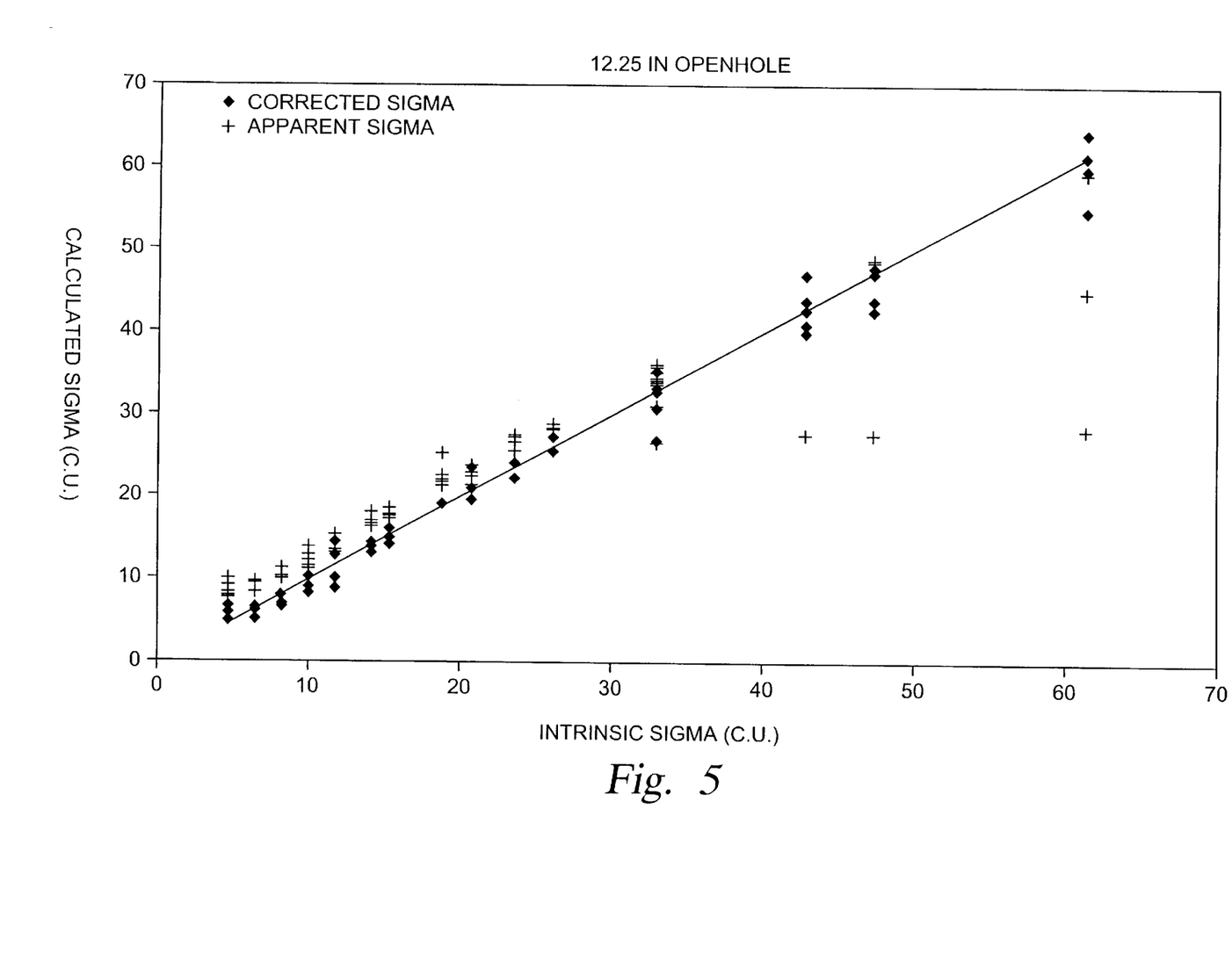
Figure 6:
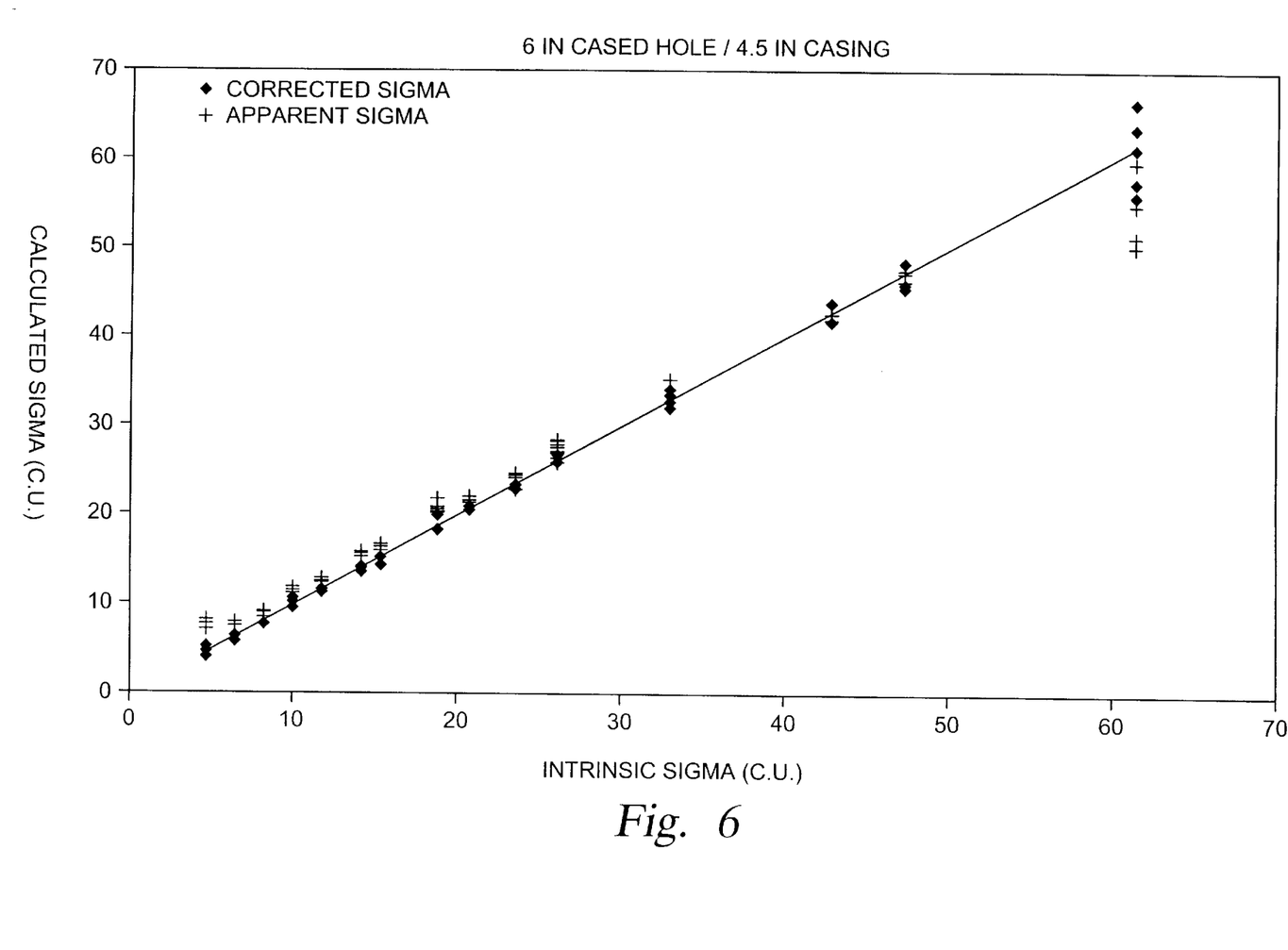
Figure 7:
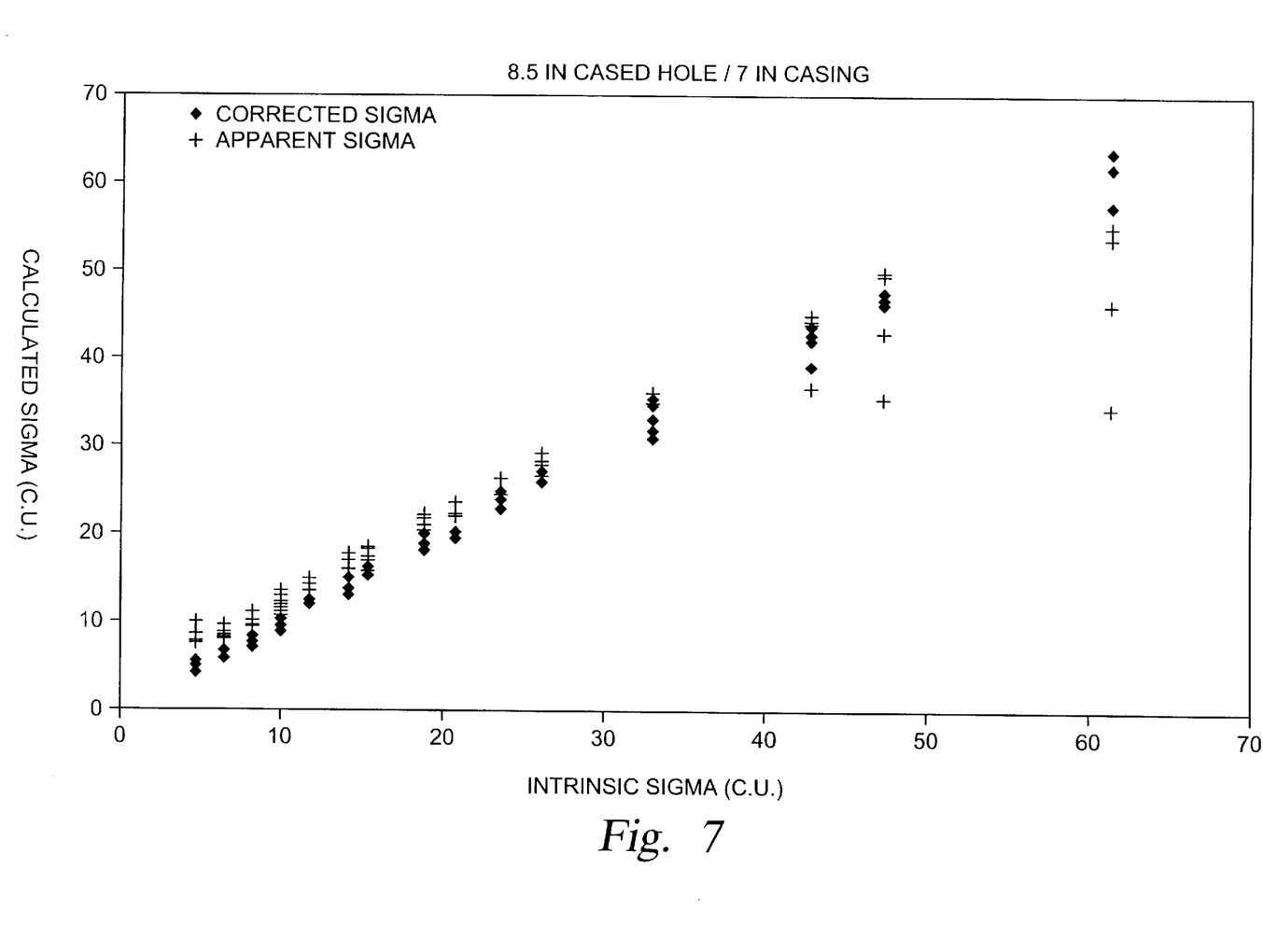
Figure 8:
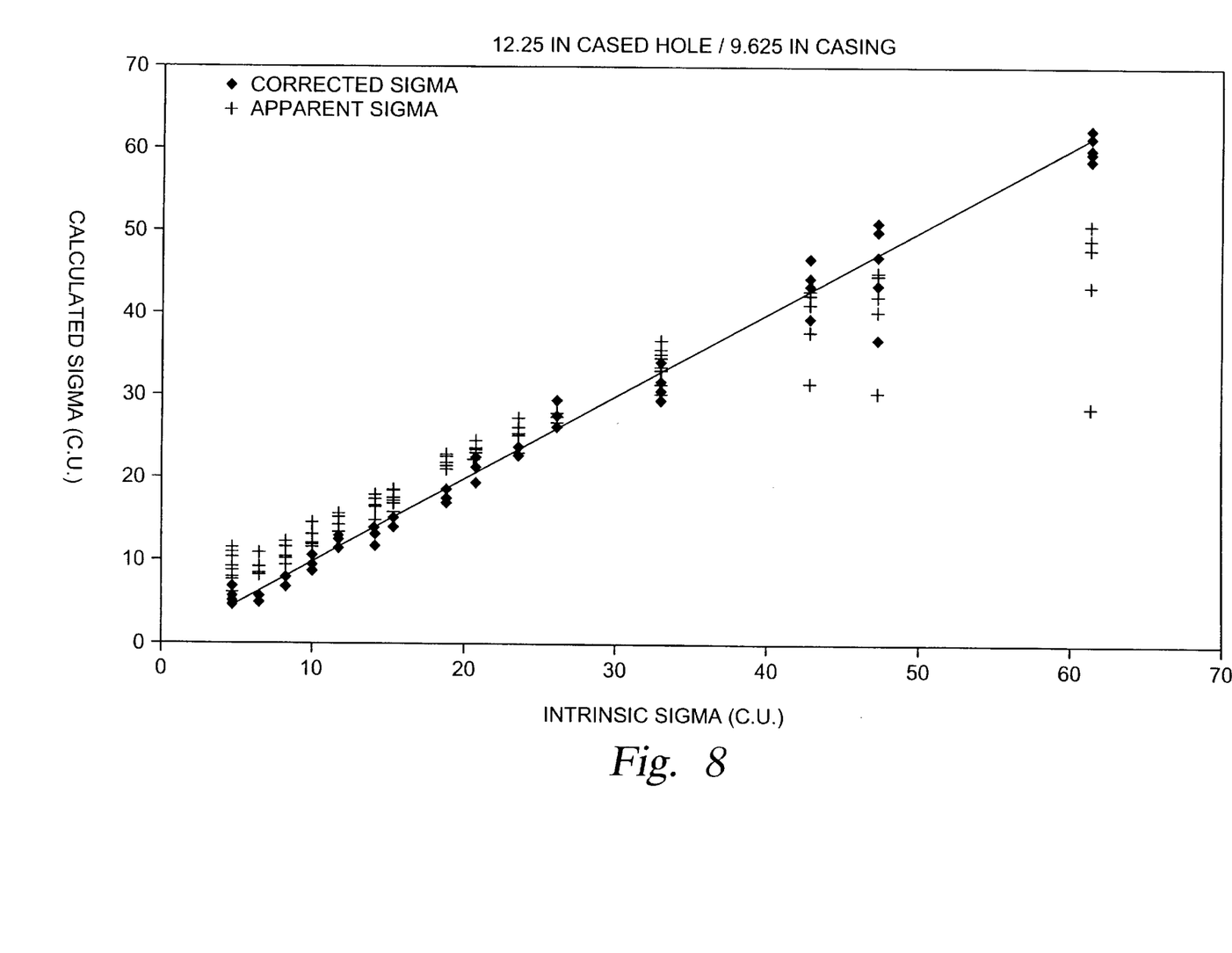

FIG. 2 shows a curve 30 fit through typical numbers of detected capture gamma rays with respect to time, for one of the detectors of the instrument of FIG. 1. The detected capture gamma rays (referred to as "counts") from each detector can be divided into time-bounded "regions" as shown in FIG. 2. A first region 32 generally should begin at the time at which the neutron source (12 in FIG. 1) is turned off. For a pulsed neutron logging instrument described in a brochure entitled, PDK-100, Western Atlas Logging Services, Houston, Tex. (1994), for example, the time of the end of each neutron burst is about 100 microseconds from initiation of each neutron burst (the initiation time is generally understood to represent time=0). In this example, the first region 32 can end at about 250 microseconds from time=0. The second region 34 can begin at the end of the first region 32, and continue to a time of about 500 microseconds from time =0. A third region 36 can begin at the end of the second region 34 (at about 500 microseconds) and ends at 1,000 microseconds from time=0, which is the time at which the subsequent neutron burst begins. The number of these regions is not critical to the invention. Selecting three regions as shown in the example of FIG. 2 represents an empirically determined optimum for both the accuracy of the calculated capture cross-section and the statistical precision of the results for an instrument configured as is the instrument in the PDK-100 reference. As the number of such regions is increased, the accuracy of the results will generally increase. Conversely, the statistical precision of the results will decrease as the number of regions increases, and correspondingly the total number of counts in each such region decreases. It has been determined that a minimum of two regions is necessary to make the method of the invention work properly.

The stated time boundaries of the regions have also been determined empirically to provide the best overall results for an instrument configured as is the one described in the PDK-100 reference. The time boundaries of the regions for any other configuration of logging instrument will depend primarily on the number of detectors and the spacing of each detector from the source (12 in FIG. 1). It is to be understood, therefore, that the time boundaries stated herein are those empirically determined to work well for the logging instrument shown in FIG. 1 and for the instrument shown in the PDK-100 reference. Other configurations for logging instrument may prove to work better with different time boundaries for the regions 32, 34, 36, or different numbers of regions.

It has also been determined that for the three-detector logging instrument shown in FIG. 1, having the first region end at 400 microseconds, and having the second region end at 1,000 microseconds, effectively providing only two regions, will also perform satisfactorily.

For each detector, the total number of counts in each region 32, 34, 36 should then be normalized by dividing the number of counts in each region 32, 34, 36 by the total number of counts detected from the beginning of the first region 32 to the end of the last region, which in this example is the third region 36. Normalization substantially eliminates any effects of small variations in the output of the source (12 in FIG. 1) on the results calculated.

The normalized counts from each region, for each detector, can be entered into an empirically determined relationship such as shown below to determine a corrected value for capture cross section, $\Sigma_c$, of the earth formation:

$$\Sigma_c = \Sigma_1 + \frac{A_0 + \sum_{i=1}^{N}\sum_{j=1}^{M-1} A_{ij}P_{ij} + \sum_{i=1}^{N}\sum_{j=1}^{M-1} B_{ij}P_{ij}^2 + \sum_{i=1}^{N}\sum_{j=1}^{M-1} C_{ij}P_{ij}^3 + ...}{1 + \sum_{i=1}^{N}\sum_{j=1}^{M-1} D_{ij}P_{ij} + \sum_{i=1}^{N}\sum_{j=1}^{M-1} E_{ij}P_{ij}^2 + \sum_{i=1}^{N}\sum_{j=1}^{M-1} F_{ij}P_{ij}^3 + ...} \quad (1)$$

where $\Sigma_1$ represents an apparent capture cross-section from the counts measured by the near detector (14 in FIG. 1) and $P_{ij}$ represents the detector counts in the j-th time region for the i-th detector. Alternatively, $P_{ij}$ can represent for each detector in each time region, a parameter which is related to the total number of counts or the rate of change in the number of counts with time, such as an apparent capture cross-section. Coefficients, $A_{ij}$, $B_{ij}$, $C_{ij}$, $D_{ij}$, $E_{ij}$, $F_{ij}$ in equation (1) can be determined from simulated detector data generated by numerical simulation of earth formations and wellbore conditions, such as by Monte Carlo modeling, as will be further explained. The actual values of the coefficients will depend on the configuration of the instrument (10 in FIG. 1), which includes the sizes, spacings and types of the detectors (14, 16, 18 in FIG. 1) and the wellbore (2 in FIG. 1) diameter, and whether the wellbore 2 is cased or uncased. M in equation (1) represents one less than the total number of regions into which the count rate curve 30. One less than the total number of regions can be used since the number of counts in the last region will be known as the difference between the total number of counts less the number of counts in all but the last region.

Equation (1) as shown is at least a third order polynomial expression. Using a third or higher order polynomial expression is not required to practice the method of the invention. In the example to be discussed below, a second order polynomial provides acceptable results. It should be noted that the accuracy of the calculations can be improved by using higher order polynomial expressions, however the number of coefficients will increase correspondingly, making the calculation slower and more difficult. Lower order expressions may represent a fair compromise between accuracy and speed of calculation. It should also be understood that expressions other than polynomials may be used to determine an empirical relationship between counts in each region at each detector and known values of formation capture cross section over a wide range of wellbore capture cross-sections and diameters. Selection of polynomial expressions is a matter of convenience for the system designer and is not meant to limit the invention.

Determining the coefficients $A_{ij}$ through $F_{ij}$ for any particular configuration of the instrument 10 can be explained as follows. A numerical simulation of the response of the instrument 10 to earth formations having known values of $\Sigma$ can be performed. The numerical simulation can include an "instrument" configured substantially as described herein and as shown in FIG. 1, a simulated "wellbore" having a selected diameter, and a simulated "earth formation" having a selected value of porosity, located on one side of the "instrument" and in contact with the "instrument". The simulated arrangement of wellbore, formation and instrument is substantially the same as shown in FIG. 1. The simulated "wellbore" is presumed to be filled with "liquid" having a selected concentration of sodium chloride (or alternatively a known value of capture cross-section). The pore spaces of the simulated earth formation are filled with a simulated "fluid" having a selected value of salinity, or known value of capture cross-section. Similarly, the apparent mineral composition of the earth formation can be selected from among known mineral compositions for earth formations.

For each set of selected values of porosity, formation mineral composition, and formation fluid salinity (or fluid capture cross-section), the "earth formation" thus simulated will have a so-called "intrinsic" value of capture cross-section which represents the fractional contribution to the capture cross-section of the rock minerals and the fluid in the pore spaces. The "intrinsic" value of capture cross-section is independent of the response of the simulation "instrument" as affected by neutron diffusion or wellbore salinity. The actual response of the simulation instrument to "real" conditions including variations in the salinity of fluid in the simulation wellbore is determined by simulating the response of the entire simulated system described above using various values for wellbore diameter and wellbore fluid salinity (or capture cross-section).

The selected parameters can be used with Monte Carlo simulation or any similar numerical simulation method to generate synthetic capture gamma ray count rates for each one of the "detectors" on the simulation "instrument". Each numerical simulation using a particular group of selected parameters can be referred to as a parameter set. The simulated counts for each detector in each parameter set can then be divided into regions such as 32, 34, 36 in FIG. 2 and ultimately entered into the relationship of equation (1).

This simulation of capture gamma ray count rates can be repeated for a large number of different values for each of the above listed parameters from within ranges of values of each parameter generally known to exist. The values used in testing the method of the invention are described below in Table 1.

TABLE 1

| PARAMETER | VALUES SELECTED |
| --- | --- |
| Formation Porosity | 0, 10, 20, 30, 40 p.u. |
| Formation Fluid Salinity | 0, 50, 100, 200, 300 kppm |
| Formation Mineral Composition | Limestone, Sandstone, Dolomite |
| Wellbore Diameter | 6, 8.5, 12.25 inches, simulated for both open and cased wellbores |
| Wellbore Fluid Salinity | 0, 50, 100, 200, 300 kppm |

After the count rates are simulated for each parameter set, consisting of a possible combination of the parameters shown in Table 1, the coefficients for equation (1) can be determined.

The coefficients can be determined for the condition where the sum of regression errors is minimized for all the simulated parameter sets. The regression error is related to the difference between the value of capture cross-section calculated according to equation (1), and the "intrinsic" value of capture cross section of the simulated earth formation for the particular parameter set simulated. The values of the coefficients are adjusted until the sum of the errors reaches a minimum. The coefficients can be determined when the error function is minimized using a least-squares model. The error function to be minimized, $\chi$, can be represented by the expression:

$$\chi^2 = \frac{1}{K-L-1} \sum_{j=1}^{M} (\Sigma^j - \Sigma_c^j)^2 \quad (2)$$

where K represents the total number of data points for which synthetic gamma ray count rates were simulated, L represents the number of coefficients in the particular "model" (which can be 17 according to equation (1) if the number of detectors is equal to two, the number of decay spectrum regions is equal to three and the highest degree polynomial in equation (1) is two), $\Sigma^j$ represents the intrinsic value of thermal neutron capture cross-section of the earth formation for the j-th parameter set sampled, and $\Sigma_c^j$ represents the value of thermal neutron capture cross-section calculated according to equation (1).

The coefficients thus determined for any arrangement of source and detectors in an actual well logging instrument, such as shown in FIG. 1, can be used during well logging operations to calculated corrected values of thermal neutron capture cross-section from the capture gamma ray counting rates measured by any one or all of the detectors. It should be noted that the calculations of capture cross-section made according to the invention may be done at any time after the gamma ray count rates are measured, either in the recording system 8 or in any computer capable of being programmed to perform the calculations according to equation (1).

In the simulation results to be discussed below, the instrument was configured as shown in the PDK-100 reference, wherein only two detectors are used. The counts at each detector were divided into three regions. It is not necessary to have an instrument with three detectors in order to perform the method of this invention. It is only required to have at least two detectors. Having additional detectors will improve the accuracy of the result, while correspondingly reducing the speed with which results can be calculated. Three detectors as shown in FIG. 1 represents a commercially acceptable compromise between speed and accuracy. The simulation discussed below was performed on an instrument configured as shown in the PDK-100 reference in order to demonstrate the applicability of this invention to currently available pulsed-neutron well logging instruments.

3. Simulation Results

FIGS. 3–8 show graphs of the accuracy of calculations of thermal neutron capture cross-section from counts detected by the near detector, for various simulated wellbore diameter, wellbore salinity and formation capture cross-section conditions selected from the values shown in Table 1. In the graphs of FIGS. 3–8, an apparent capture cross-sections for the near detector, calculated only from the simulated detector count rates for each parameter set are shown by the "+" symbols. The apparent capture cross-section can be calculated using methods known in the art, such as described, for example in the PDK-100 reference. After correcting each value of apparent capture cross-section using the relationship of equation (1), the corrected values of capture cross-section are indicated by the "♦" symbols. Each graph in FIGS. 3–8 has an identity line for visual comparison, this line representing equal apparent and true capture cross-section values over the range of each graph.

The invention provides improved accuracy in determining thermal neutron capture cross-section of an earth formation without explicit knowledge of the salinity of the fluid in the wellbore, or knowledge of the porosity of the earth formation, as required in prior art methods.

Those skilled in the art will devise other embodiments of this invention which do not depart from the spirit of the invention as disclosed herein. Therefore the invention should be limited in scope only by the attached claims.

What is claimed is:

1. A method for determining thermal neutron capture cross-section of earth formations penetrated by a wellbore from counts of capture gamma rays detected at at least two spaced apart locations from a source which irradiates said formations with bursts of high energy neutrons, comprising:

determining an apparent capture cross-section from counts detected at one of said spaced apart locations; and determining said thermal neutron capture cross section by adjusting said apparent capture cross-section by a correction factor determined from counts detected at each of said spaced apart locations, said correction factor determined from an empirical relationship of known values of formation capture cross-section and, wellbore diameter with respect to counts at each of said spaced apart locations.

2. The method as defined in claim 1 wherein said empirical relationship is determined by numerically simulating counts which would be detected at said spaced apart locations in response to said known values, and adjusting coefficients in said relationship to minimize an error function comprising differences between formation thermal neutron capture cross-section calculated according to said empirical relationship and said known values of formation capture cross-section used to perform said numerical simulation.

3. The method as defined in claim 1 wherein said coefficients are determined for at least two time regions between successive ones of said bursts by segregating said simulated counts from each of said spaced apart locations into said time regions, and wherein said counts detected in response to said bursts irradiating said earth formations divided into the same at least two time regions.

4. The method as defined in claim 3 wherein said counts are divided into three of said time regions, and said counts are detected at two spaced apart locations.

5. A method for determining a thermal neutron capture cross-section of earth formations penetrated by a wellbore, comprising:

irradiating said earth formations with bursts from a source of high energy neutrons;

detecting capture gamma rays at at least two spaced apart locations from said source;

determining an apparent capture cross-section from counts detected at one of said spaced apart locations; and determining said thermal neutron capture cross section by adjusting said apparent capture cross-section by a correction factor determined from counts detected at each of said spaced apart locations, said correction factor determined from an empirical relationship of known values of formation capture cross-section and, wellbore diameter with respect to counts at each of said spaced apart locations.

6. The method as defined in claim 5 wherein said empirical relationship is determined by numerically simulating counts which would be detected at said spaced apart locations in response to said known values, and adjusting coefficients in said relationship to minimize an error function comprising differences between formation thermal neutron capture cross-section calculated according to said empirical relationship and said known values of formation capture cross-section used to perform said numerical simulation.

7. The method as defined in claim 5 wherein said coefficients are determined for at least two time regions between successive ones of said bursts by segregating said simulated counts from each of said spaced apart locations into said time regions, and wherein said counts detected in response to said bursts irradiating said earth formations divided into the same at least two time regions.

8. The method as defined in claim 7 wherein said counts are divided into three of said time regions, and said counts are detected at two spaced apart locations.

9. A method for determining thermal neutron capture cross-section of earth formations penetrated by a wellbore from counts of capture gamma rays detected at at least two spaced apart locations from a source which irradiates said formation with bursts of high energy neutrons, comprising:

(a) determining an apparent capture cross-section from counts detected at one of said spaced apart locations, and;

(b) calculating said thermal neutron capture cross sections by adjusting said apparent capture cross sections by a correction factor calculated from counts detected at each of said spaced apart locations, said correction factor calculated by determining an empirical relationship of known values of formation capture cross section and wellbore diameter with respect to counts at each of said spaced apart locations, said empirical relationship based in part upon segregating said counts into at least two time regions.

10. The method as defined in claim 9 wherein determining said empirical relationship further comprises numerically simulating counts which would be detected over said at least two time regions at said spaced apart locations in response to said known values, and adjusting coefficients in said relationship to minimize an error function comprising differences between formation thermal neutral capture cross section calculated according to said empirical relationship and said known values of formation capture cross-section used to perform said numerical simulation.

11. The method as defined in claim 10 wherein adjusting said coefficients further comprises segregating said simulating counts from each of said spaced apart locations into said time regions.

12. The method as defined in claim 11 wherein said at least two time regions consists of three time regions, and said at least two spaced apart locations consists of two spaced apart locations.

13. A method for determining a thermal neutron capture cross-section of earth formations penetrated by a wellbore, comprising:

(a) irradiating said earth formations with bursts from a source of high energy neutrons;

(b) detecting gamma rays at at least two spaced apart locations from said source;

(c) determining an apparent capture cross section from counts detected at one of said spaced apart locations; and (d) calculating said thermal neutron capture cross section by adjusting said apparent capture cross section by a correction factor calculated from counts detected within at least two time regions at each of said spaced apart locations, said correction factor calculated by determining an empirical relationship of known values of formation capture cross section and wellbore diameter with respect to counts within the at least two time regions at each of said spaced apart locations.

14. The method as defined in claims 13 wherein determining the empirical relationship further comprises numerically simulating counts which would be detected at said spaced apart location in response to known values, and adjusting coefficients in said relationship to minimize an error function comprising differences between formation neutron capture cross-section calculated according to said empirical relationship and said known values of formation capture cross section used to perform said numerical simulation.

15. The method as defined in claims 14 wherein adjusting said coefficients further comprises segregating said simulated counts from each of said spaced apart locations into said time regions.

16. The method as defined in claim 15 wherein said at least two time regions consists three time regions and said at least two spaced apart detectors are three spaced apart detectors.

17. The method of claim 1 wherein determining the empirical relationship further comprises determining the ratio of two polynomials of the detected counts.

18. The method of claim 5 wherein determining the empirical relationship further comprises determining the ratio of two polynomials of the detected counts.

19. The method of claim 9 wherein determining the empirical relationship further comprises determining the ratio of two polynomials of the detected counts.

20. The method of claim 13 wherein determining the empirical relationship further comprises determining the ratio of two polynomials of the detected counts.

* * * * *

UNITED STATES PATENT AND TRADEMARK OFFICE
CERTIFICATE OF CORRECTION

PATENT NO.   : 6,124,590
DATED        : September 26, 2000
INVENTOR(S)  : Medhat W. Mickael It is certified that error appears in the above-identified patent and that said Letters Patent is hereby corrected as shown below:

<u>Title page,</u>
Item [56], U.S. PATENT DOCUMENTS, add the following References Cited that were left off:

-- 3,509,324  04/28/70  J. T. Dewan
   4,041,309  08/09/77  Hopkinson
   4,445,033  09/14/81  Preeg et al.
   4,996,017  02/26/91  Ethridge
   5,235,185  08/10/93  Albats et al.
   5,777,323  07/07/98  James L Hemingway --

Signed and Sealed this

Twenty-ninth Day of April, 2003

JAMES E. ROGAN
*Director of the United States Patent and Trademark Office*